United States Patent [19]

Tults

[11] Patent Number: 5,619,275
[45] Date of Patent: Apr. 8, 1997

[54] TV LINE AND FIELD DETECTION APPARATUS WITH GOOD NOISE IMMUNITY

[75] Inventor: Juri Tults, Indianapolis, Ind.

[73] Assignee: Thomson Consumer Electronics, Inc., Indianapolis, Ind.

[21] Appl. No.: 382,023

[22] PCT Filed: Jul. 29, 1993

[86] PCT No.: PCT/US93/07142

§ 371 Date: Feb. 9, 1995

§ 102(e) Date: Feb. 9, 1995

[87] PCT Pub. No.: WO94/06243

PCT Pub. Date: Mar. 17, 1994

[30]     Foreign Application Priority Data

Sep. 1, 1992 [GB]   United Kingdom ................. 9218476

[51] Int. Cl.⁶ ................................................ H04N 7/087
[52] U.S. Cl. ........................ 348/526; 348/533; 348/468
[58] Field of Search ..................... 348/468, 478, 348/465, 540, 547, 533, 526, 531, 558; H04N 5/04, 5/08, 7/087

[56]            References Cited

U.S. PATENT DOCUMENTS

| | | | |
|---|---|---|---|
| 4,172,262 | 10/1979 | Hosoya | 358/21 V |
| 4,489,343 | 12/1984 | Hosoya . | |
| 4,679,080 | 7/1987 | Bashford et al. | 348/526 |
| 4,792,852 | 12/1988 | Narusawa | 348/533 |
| 5,025,496 | 6/1991 | Canfield | 358/148 |
| 5,436,668 | 7/1995 | Tults | 348/547 |

FOREIGN PATENT DOCUMENTS

| | | | |
|---|---|---|---|
| 57-052280 | 12/1980 | Japan . | |
| 60-229590 | 4/1986 | Japan . | |
| 0153963 | 6/1988 | Japan | H04N 5/08 |
| 092022171 | 12/1992 | WIPO | H04N 7/087 |
| 093001680 | 1/1993 | WIPO | H04N 5/04 |

OTHER PUBLICATIONS

EDN, vol. 35, No. 4, 15 Feb. 1990, Newton (US), p. 185, Andrew K Dart "Simple Circuit Extracts TV Sync Pulse".
Patent Abstracts of Japan, vol. 10, No. 87, 5 Apr. 1986, and Japan Pat. 60-229590 Nippon Denki KK, 14 Nov. 1985 (see above).
Patent Abstracts of Japan, vol. 6, No. 123, 8 Jul. 1982 and Japan Pat. 57-052280 (Sanyo Electric Co., Ltd), 27 Mar. 1982 (see above).
IEEE Transactions on Consumer Electronics, vol. 38, No. 3, Aug. 1992, New York (US), pp. 261–267, N.F. Hurley "A Single Chip Line 21 Captioning Deoder".

*Primary Examiner*—Victor R. Kostak
*Attorney, Agent, or Firm*—Joseph S. Tripoli; Peter M. Emanuel; Robert D. Shedd

[57]            ABSTRACT

An auxiliary video information decoder for decoding information such as closed caption data in a video signal identifies a desired horizontal line of video in a video signal. A reference pulse in a synchronizing signal is detected followed by the generation of first and second window pulse signals occurring at predetermined delays after detection of the reference pulse. A pulse occurring in the synchronizing signal during the window pulses indicates the start of the desired horizontal line interval. A field identification signal may also be generated. Features for improving noise and phase error immunity when identifying a video line are provided.

7 Claims, 3 Drawing Sheets

TV LINE AND FIELD DETECTION APPARATUS WITH GOOD NOISE IMMUNITY

FIELD OF THE INVENTION

The present invention relates to detection of information that may be present in a video signal during vertical blanking intervals.

BACKGROUND

A video signal typically includes vertical display intervals or fields, having a plurality of horizontal line intervals, e.g. 262.5 lines per field in NTSC video systems. The beginning of each vertical and horizontal interval is identified by respective vertical and horizontal sync pulses that are included in a composite video signal. During a portion of each vertical interval, information in the video signal may not be intended for display. For example, a vertical blanking interval spans approximately the first 20 horizontal line intervals in each field. In addition, several line intervals adjacent to the vertical blanking period, e.g. line 21, may be within an overscan region of a video display and will not be visible.

The lack of displayed image information during blanking and overscan intervals makes it possible to insert an auxiliary information component, e.g. teletext or closed caption data, into these intervals. Standards such as Federal Communications Commissions (FCC) Regulations define the format for each type of auxiliary information including the positioning of the information within a vertical interval. For example, the present closed captioning standard (see e.g. 47 CFR §§15.119 and 73.682) specifies that digital data corresponding to ASCII characters for closed captioning must be in line 21 of field 1. Future modifications to the standard may permit auxiliary information such as closed caption data to be located in other lines, e.g. line 21 of every field.

Auxiliary video information is extracted from the video signal using a decoder. Acceptable performance of the decoder requires reliable identification of the particular lines and fields of the video signal that include auxiliary video data. Examples of approaches to identifying particular video line intervals are disclosed in JP-A-57 052 280 and U.S. Pat. No. 4,172,262. If video signal strength decreases (e.g. caused by poor reception), the probability of errors in the decoder output increases. For example, detection of synchronizing events in a video signal, such as vertical sync pulses, may provide a timing reference point for identifying video lines (e.g. line 21) that may contain auxiliary video information. However a decrease in video signal strength causes a corresponding decrease in sync signal amplitude. Attempting to decode auxiliary video information from a weak video signal increases the likelihood either that the desired synchronizing pulses may not be detected or that noise pulses may be erroneously interpreted as the desired synchronizing pulses. As a result, a decoder may operate incorrectly in response to a weak video signal.

The error rate of the decoder should remain at an acceptable level as long as the strength of the video signal is sufficient to produce a "viewable" picture. The point at which the error rate becomes unacceptable depends on the content of the auxiliary information. For example, an error rate causing loss of several characters of closed caption text during an interval spanning several minutes may not be objectionable. It is desirable, however, to minimize the error rate over a broad range of video signal strength.

SUMMARY OF THE INVENTION

In accordance with aspects of the present invention, apparatus comprises first detecting means for detecting a first pulse included in a synchronization component of a video signal for indicating the beginning of a vertical display interval of the video signal; a counter responsive to a clock signal having a period representative of a horizontal display interval of the video signal for generating a count representing the number of horizontal display intervals within the vertical display interval after the first detecting means detects the first pulse; means responsive to the clock signal for generating an enable signal defining an enable interval beginning in response to the count being a predetermined count and ending after a time interval greater than a phase difference between the synchronization component and the clock signal; and second detecting means responsive to the enable signal for detecting during the enable interval a second pulse included in the synchronization component for indicating the start of a predetermined horizontal display interval in the vertical display interval, the second pulse being substantially centered within the enable interval when the phase difference is a predetermined value.

The invention may be better understood by referring to the drawing in which:

DETAILED DESCRIPTION

Figure 1:
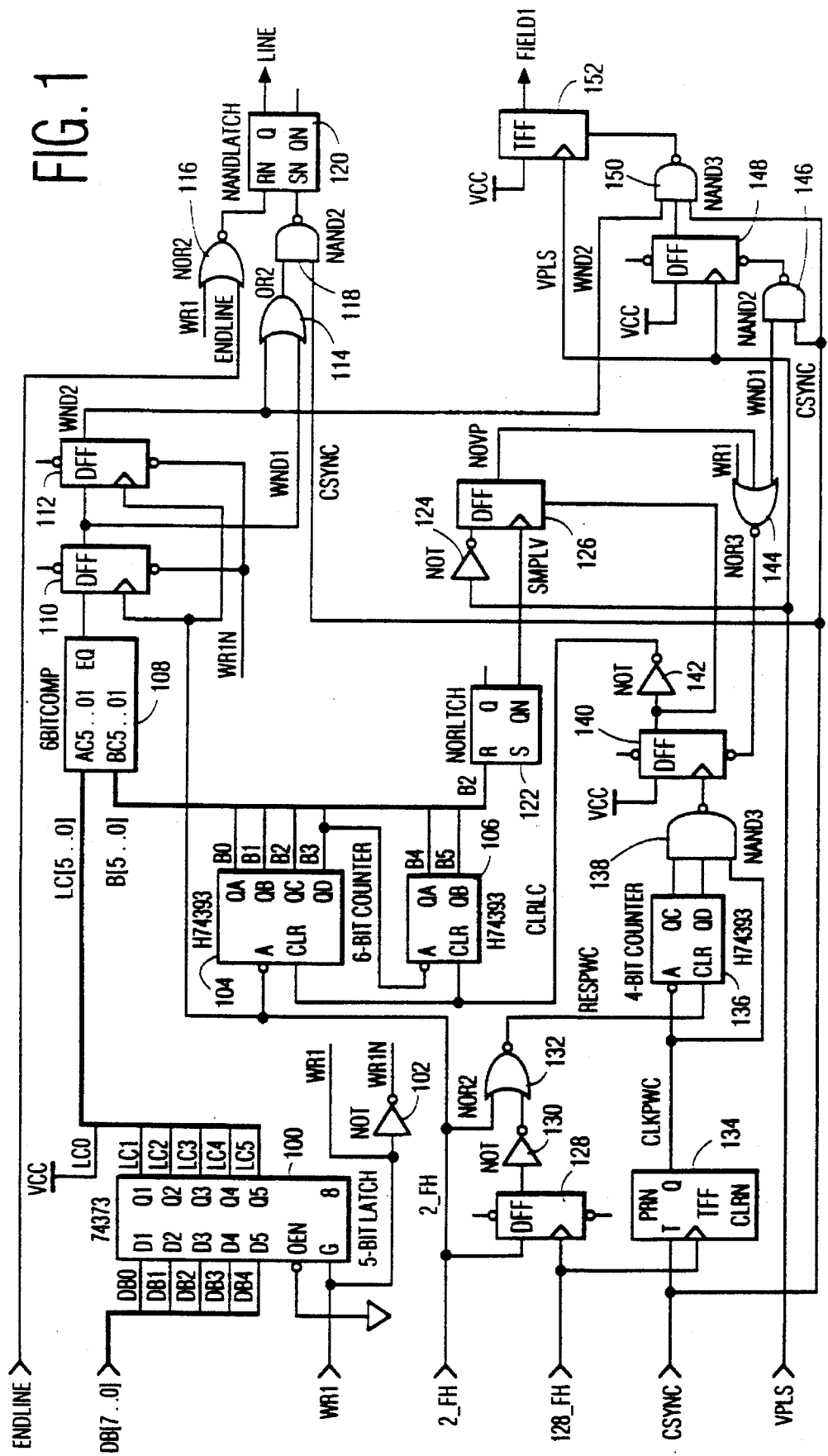
FIG. 1 shows a circuit diagram of a portion of a video signal processing system that includes video line detection apparatus according to the present invention.

In regard to the following detailed description of an embodiment of the invention that is shown in the drawing, it should be remembered that a television system may include features for generating various synchronizing signals. For example, a sync separator may produce sync signals derived from the sync components of the video signal. Deflection circuitry produces repetitive sync signals at regular intervals to define uniform electron beam deflection intervals. The input signals for the circuit in FIG. 1 include a separated sync signal CSYNC derived from the video signal, and a flyback pulse VPLS from the vertical deflection circuitry.

Figure 2:
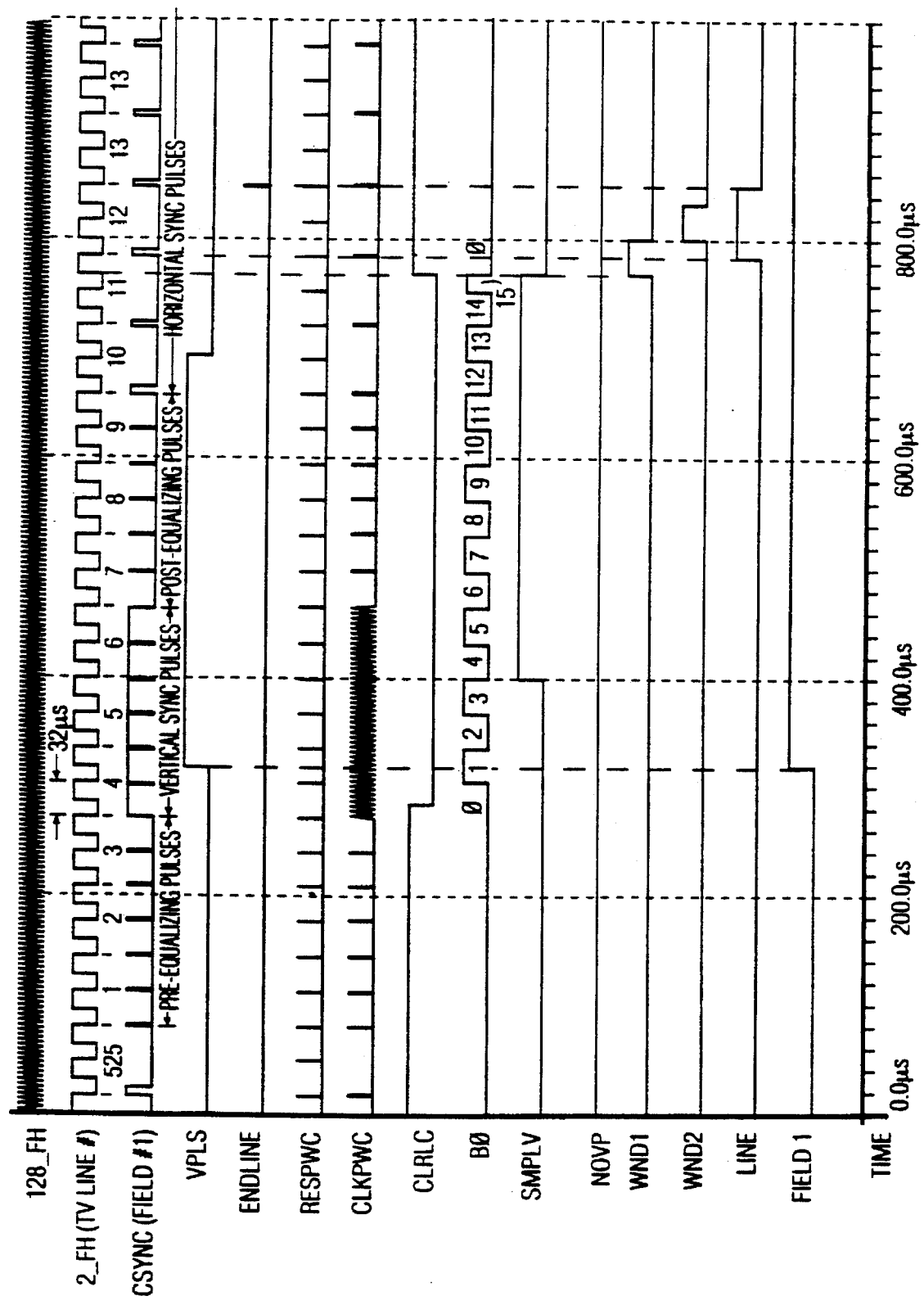
FIGS. 2 and 3 show signal waveforms useful for understanding the operation of the circuit shown in FIG. 1.

Other input signals in FIG. 1 include signals 128FH and 2FH which serve as clock signals at frequencies of 128 times the horizontal rate and 2 times the horizontal rate, respectively. For NTSC systems, signals 128FH and 2FH have periods of approximately 0.5 μs and 32 μs, respectively. Signals 128FH and 2FH may be generated at the outputs of appropriate stages of a counter (not shown in FIG. 1). This counter may be part of, for example, a high frequency phase lock loop (PLL) associated with an on-screen display (OSD) feature that may be included in the video system. The PLL is locked to the horizontal deflection pulses and, therefore, indirectly to the horizontal sync component of the video signal. As a result, normal horizontal sync pulses in signal CSYNC line up with every other falling edge of signal 2 FH as shown in FIG. 2.

Input signal WR1 in FIG. 1 may be generated, for example, by a microcomputer (μC) (not shown in FIG. 1) that controls the system. Signal WR1 serves to reset some circuits and load a number (also supplied by the μC) into 5-bit latch 100 at the start of operation. The number stored in latch 100 is related to the TV line to be identified. Changing the number in latch 100 permits changing the line number that will be identified in accordance with the specification for the type of auxiliary information that is being decoded.

For the exemplary embodiment shown in FIG. 1, the relationship between the number loaded in latch 100 and the particular line identified by the system is: L=N–5, where N is the line to be identified, and L is the number loaded in latch 100. As is discussed further below, the value 5 that is subtracted from N is related to the line number at which the first wide vertical pulse occurs as defined by the particular video signal specification (e.g. line 4 in field 1 for NTSC standard signals as shown in FIG. 2). The following description of the operation of the embodiment in FIG. 1, and the waveforms in FIGS. 2 and 3, assumes that the values of N and L are 12 and 7, respectively. Thus, line 12 is being identified and the number 7 is loaded in 5-bit latch 100. As will be apparent from the following description, different values may be used for N and L to permit identifying other line numbers, e.g. line 21 for closed caption data.

The circuit shown in FIG. 1 looks for a pulse in signal CSYNC which is wider than 12 μs, i.e. it looks for the first wide vertical sync pulse which is normally 30 μs long (the approximate width of horizontal sync and equalizing pulses is 4 μs and 2 μs respectively). This function is implemented with 4-stage counter 136. Counter 136 is reset every 32 μs by signal RESPWC, a narrow pulse generated at the falling edge of signal 2FH by D-type flip flop (DFF) 128, inverter 130, and NOR gate 132. Counter 136 is clocked by signal CLKPWC at 1 μs intervals whenever signal CSYNC is at logic 1. Signal CLKPWC is generated by toggle flip flop (TFF) 134 having a clock input coupled to signal 128FH and a toggle input (T) coupled to signal CSYNC.

A count of 12 in counter 136 is detected by NAND gate 138 when signal CLKPWC is high. The output of NAND gate 138 is coupled to the clock input of DFF 140. The output of DFF 140 goes to logic 1 in response to counter 136 reaching a count of 12. Signal CLRLC, an inverted version of the output of DFF 140 via inverter 142, is coupled to the reset input of a 6-bit counter comprised of counters 104 and 106. The clock input of counters 104 is coupled to signal 2FH. The most significant output of counter 104 clocks counter 106. The effect of counter 136 reaching a count of 12 is that the reset signal to counters 104 and 106 is removed enabling counters 104 and 106 to count negative transitions of signal 2 FH after counter 136 reaches a count of 12.

When the count produced by counters 104 and 106 reaches the value stored in latch 100, as determined by comparator 108, 32 μs wide window pulse signal WND1 is generated by DFF 110 in synchronism with positive transitions of signal 2 FH. Another 32 μs wide window pulse on signal WND2 is generated by DFF 112 when the window pulse on signal WND1 terminates.

As shown in FIG. 1, the least significant bit of the "A" input to comparator 108 (input from latch 100) is hard-wired to logic 1 (VCC) while the number stored in latch 100 is coupled to the remaining "A" inputs of comparator 108. The effect is that the value at the "A" input of comparator 108 is equal to (2×L)+1. This approach is used so that changing the value of L by an integer amount causes the line number being detected to change by the same integer amount. For example, storing 16 rather than 7 in latch 100 will cause line 21 rather than line 12 to be detected.

Figure 3:
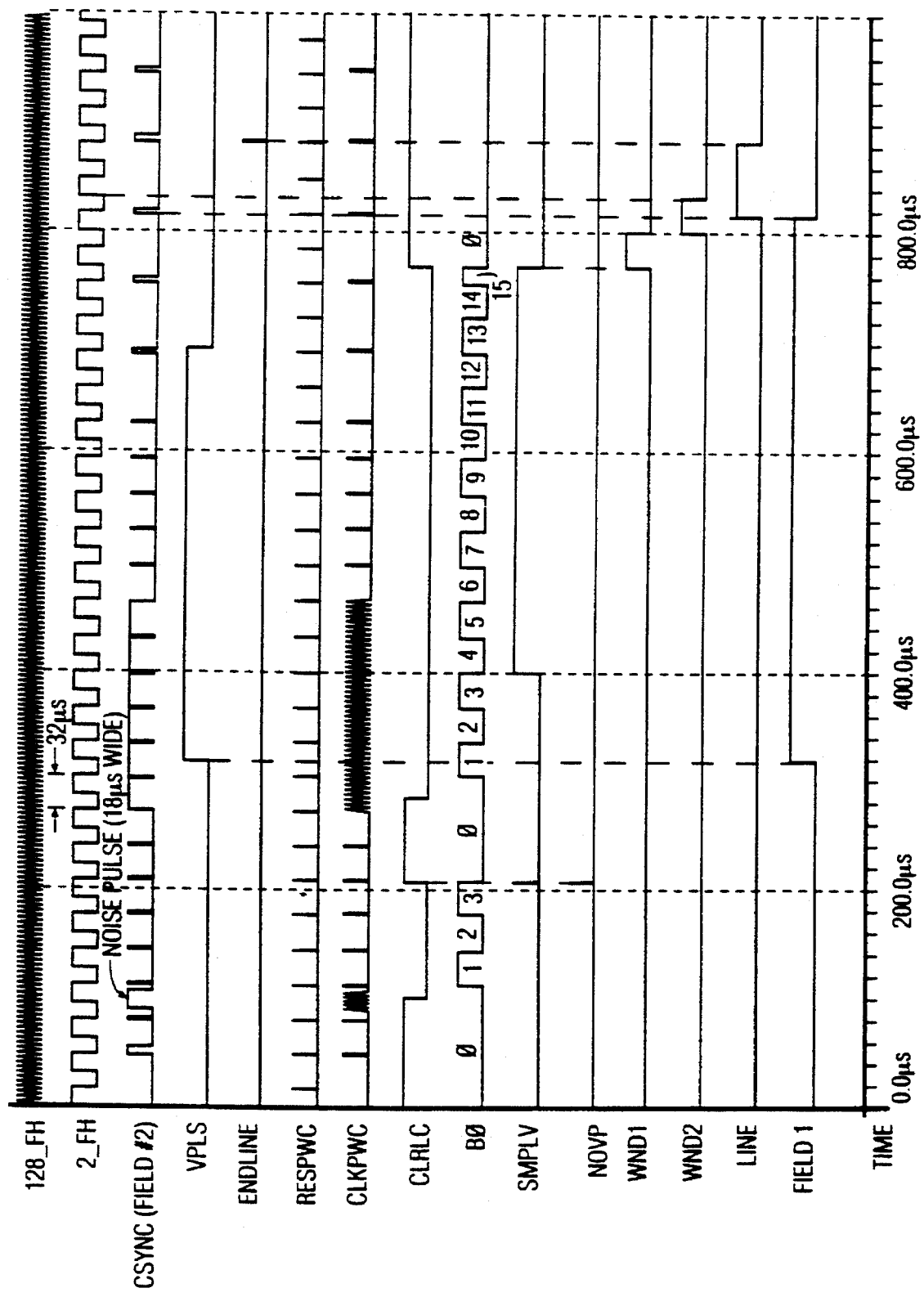

The value of L is multiplied by 2 in the relationship (2×L)+1 because counters 104 and 106 are being clocked at twice the horizontal line rate by signal 2FH. The number 1 is added to (2×L) because it is desirable to shift the window pulses on signals WND1 and WND2 by one-half of a horizontal line interval (1 cycle of signal 2FH) so that the horizontal sync pulse occurring at the beginning of the desired line will be centered in the window pulse. Thus, for the described exemplary embodiment, comparator 108 will indicate that the output of counters 104 and 106 equals the latch value L, and enable the generation of the window pulses, when the count value at the output of counters 104 and 106 is 15 (i.e. (2×7)+1). The value in counters 104 and 106 is indicated on the waveform for signal B0 (the least significant counter output bit) in FIGS. 2 and 3. The signal timing depicted in FIGS. 2 and 3 illustrates that the difference between the line number being identified (N) and the value stored in latch 100 (L) is the above-mentioned value 5 for the exemplary embodiment shown in FIG. 1 operating with NTSC standard signals.

A sync pulse in the signal CSYNC waveform which occurs during one of the two window pulses is the sync pulse that corresponds to the start of the desired TV line (line 12 in the described embodiment) as shown in FIG. 2. A sync pulse on signal CSYNC during one of the window pulses is detected via OR gate 114 and NAND gate 118. The output of NAND gate 118 provides a "set" signal at the set input of set-reset latch 120. Signal LINE at the output of latch 120 becomes active (goes to logic 1 in FIGS. 1 to 3) in response to the set signal to indicate detection of the desired line.

The active state of signal LINE is terminated 64 μs later by signal ENDLINE coupled to the reset input of latch 120 via NOR gate 116. The 64 μs interval is defined by a counter (not shown in FIG. 1) that is enabled for counting when the desired horizontal sync pulse occurs as indicated by signal LINE. The counter is clocked by signal 128FH having a period of 0.5 μs until a count of 128 is produced indicating that a 64 μs period has elapsed. Signal ENDLINE is then generated to terminate signal LINE.

A field identification signal FIELD1 is generated at the output of TFF 152. The rising edge of the vertical deflection pulse on signal VPLS clocks TFF 152 to produce signal FIELD1.

The preceding comments describe the operation of the embodiment shown in FIG. 1 under normal conditions, i.e. a strong signal and no noise. In accordance with aspects of the invention, features of the exemplary embodiment shown in FIG. 1 operate to ensure reliable operation during weak or noisy signal conditions.

Two lines (equivalent to four half-lines as counted with the 2 FH clock) after the 6-bit counter comprised of counters 104 and 106 is activated by signal CLRLC, the status of the vertical pulse on signal VPLS at the output of inverter 124 is sampled by DFF 126. The two line sampling delay is established by set-reset latch 122. Signal CLRLC at the set input of latch 122 "sets" signal SMPLV at the inverted output of latch 122 to logic 0 when signal CLRLC is at logic 1 inactivating counters 104 and 106. Signal B2 from the third least significant output of the 6-bit counter (22 output) is coupled to the reset input of latch 122. Signal B2 goes to logic 1 after four pulses (a two video line interval) occur on signal 2FH. Thus, when signal CLRLC activates counters 104 and 106 by going to logic 0, the set signal to latch 122 is removed enabling a high level on signal B2 (after a two video line interval) to reset latch 122 causing signal SMPLV to go to logic 1. The transition of signal SMPLV from logic 0 to logic 1 after two line intervals clocks DFF 126 sampling signal VPLS.

If the vertical pulse is absent, signal NOVP at the output of DFF 126 becomes a logic 1. Absence of the vertical pulse on signal VPLS when the sampling operation occurs indicates that the wide pulse detected by counter 136 and NAND gate 138 is a noise pulse. A logic 1 on signal NOVP resets DFF 140 via NOR gate 144 causing signal CLRLC go to logic 1. As a result, counters 104 and 106 are cleared preventing the generation of window pulses on signals WND1 and WND2.

The described feature prevents a wide noise pulse in signal CSYNC that is not in the immediate vicinity of the normal vertical sync pulses from erroneously generating the LINE signal. As an example, FIG. 3 illustrates the operation when an 18 μs wide noise pulse occurs between the first two pre-equalizing pulses in signal CSYNC. The operation of the noise detection feature is relatively independent of the phase and width of the vertical pulse on signal VPLS. The desired noise pulse detection operation occurs as long as the vertical pulse on signal VPLS does not start more than two lines after the first vertical sync pulse on signal CSYNC, and is at least two lines wide.

Values other than the above-described two line (four half line) period may be used for the delay between detection of a wide pulse (wider than 12 μs) on signal CSYNC and testing for the presence of the vertical pulse on signal VPLS. Different video systems may exhibit timing relationships between signals CSYNC and VPLS that differ from the relationship shown in FIGS. 2 and 3. For example, in certain video systems the vertical pulse on signal VPLS from deflection circuitry may begin during line 5 rather than line 4 as indicated in FIG. 2. Testing for the presence of a vertical sync pulse on signal VPLS during line 4 (a 2 line delay) when a vertical sync pulse does not begin until line 5 will cause detection of the first wide vertical pulse on signal CSYNC to be erroneously interpreted as detection of a noise pulse. Changing the delay to a 3-line delay would eliminate this problem. Thus, the operation of the described embodiment may be adapted to the requirements of various video systems.

In a noise-free environment, the desired horizontal sync pulse in signal CSYNC will always occur in the middle of the window pulse on signal WND1 in field 1, and in the middle of the window pulse on signal WND2 in field 2 as shown in FIGS. 2 and 3, respectively. This characteristic could be used for field identification, but the result may not be correct under weak signal conditions if one or more pulses occur in both adjacent windows. The circuit in FIG. 1 solves this problem by using the very reliable and noise-free vertical deflection pulse on signal VPLS to toggle TFF 152 to produce signal FIELD1.

To ensure that signal FIELD1 has the correct phase, signal FIELD1 is forced into the correct state by resetting the toggle flip-flop whenever the correct sequence of events for field 2 has been detected. This corresponds to a pulse in signal CSYNC not occurring in the window pulse on signal WND1, but being present in the immediately following window pulse on signal WND2. Detection of the sequence of events indicating field 2 is provided by NAND gates 146 and 150, and DFF 148. Operation of the described feature is illustrated in FIG. 3 where the wrong polarity of signal FIELD1 has been assumed at the start.

As described above, the active state of signal LINE is terminated by signal ENDLINE. Signal LINE could be terminated by the pulse in signal CSYNC which immediately follows the pulse on signal CSYNC that occurs during the window pulse on signal WND1 or WND2. However, noise on signal CSYNC might cause premature termination of signal LINE. Thus, signal ENDLINE is reliably generated regardless of the presence of noise as previously described.

Another feature that improves noise immunity involves using signal 2 FH rather than signal CSYNC as the clock for the line counter. Signal 2FH is the output of a counter stage in a PLL and is, therefore, relatively stable. Signal CSYNC is derived from the video signal and may exhibit noise pulses corresponding to noise in the video signal.

It should be noted that any given number loaded into the 5-bit latch will result in signal LINE becoming active for the corresponding line during field I as well as during field 2. It may be necessary, therefore, to interrogate the status of signal FIELD1 to determine whether the signal LINE is in the desired field. For example, present closed caption standards limit closed caption information to line 21 of field 1. This may be accomplished by having a μC that is controlling the system test the state of signal FIELD1 when signal LINE is active. Alternatively, hardwired logic could be used to condition signal LINE with signal FIELD1.

Another feature of the disclosed arrangement is that the 32 μs width of the window pulses on signals WND1 and WND2 permits a phase error approaching ±16 μs between the horizontal sync pulses on signal CSYNC and every other falling edge of 2 FH. This is an important feature because relatively large phase errors may occur. For example, in the case of a video cassette recorder (VCR) having mechanical misadjustments in the tape reading mechanism, the video line just before the start of the vertical blanking period where the read heads are switched is stretched (or less commonly compressed) and has a period substantially different from 64 μs. The speed of the horizontal PLL may be too slow to correct this error by the time the first wide vertical sync pulse occurs on signal CSYNC. The resulting phase error may have a magnitude approaching 16 μs. The phase error tolerance of the disclosed arrangement permits accurate decoding of auxiliary information to occur despite the existence of phase error.

I claim:

1. Apparatus comprising:

first detecting means for detecting a first pulse included in a synchronization component of a video signal for indicating the beginning of a vertical display interval of said video signal;

a counter responsive to a clock signal having a period representative of a horizontal display interval of said video signal for generating a count representing the number of said horizontal display intervals within said vertical display interval after said first detecting means detects said first pulse;

means responsive to said clock signal for generating an enable signal defining an enable interval beginning in response to said count being a predetermined count and ending after a time interval greater than a phase difference between said synchronization component and said clock signal; and second detecting means responsive to said enable signal for detecting during said enable interval a second pulse included in said synchronization component for indicating the start of a predetermined horizontal display interval in said vertical display interval, said second pulse being substantially centered within said enable interval when said phase difference is a predetermined value.

2. The apparatus of claim 1 wherein said means generating said enable signal generates a second enable signal for defining a second enable interval beginning substantially coincident with the end of the first enable interval and having a duration substantially equal to the first enable interval; and said second detecting means detects said second pulse during only one of said first and second enable intervals.

3. The apparatus of claim 1 wherein the duration of said enable interval is substantially one-half of one of said horizontal line intervals.

4. The apparatus of claim 2 wherein the duration of each of said first and second enable intervals is substantially one-half of one of said horizontal line intervals.

5. The apparatus of claim 1 wherein said means for detecting said first pulse includes a second counter for counting cycles of a second clock signal at a frequency substantially greater than the frequency of occurrence of said horizontal line intervals, said second counter counting during said first pulse to produce a second count representative of the duration of said first pulse; and means for evaluating said second count to determine if said first pulse exhibits a predetermined duration.

6. The apparatus of claim 5 wherein said predetermined duration is substantially equal to the duration of a first wide equalizing pulse in a vertical interval of an NTSC format synchronization component.

7. The apparatus of claim 6 wherein said clock signal period is ½ of the period of said horizontal line interval;

said second clock signal period is 1/128 of the period of said horizontal line intervals; and said predetermined value of said phase difference is 0.

* * * * *